United States Patent [19]

Nagahama et al.

[11] Patent Number: 4,904,856

[45] Date of Patent: Feb. 27, 1990

[54] OPTICAL PICKUP DEVICE WITH DIFFRACTION SENSING

[75] Inventors: Toshiya Nagahama; Yukio Kurata; Yoshio Yoshida, all of Tenri, Japan

[73] Assignee: Sharp Kabushiki Kaisha, Osaka, Japan

[21] Appl. No.: 282,109

[22] Filed: Dec. 9, 1988

[30] Foreign Application Priority Data

Dec. 9, 1987 [JP] Japan .................. 62-311255

[51] Int. Cl.$^4$ ............................... G01J 1/20
[52] U.S. Cl. ...................... 250/201; 369/46
[58] Field of Search .............. 250/201 DE, 204; 369/44, 45, 46

[56] References Cited

U.S. PATENT DOCUMENTS

| | | | |
|---|---|---|---|
| 4,665,310 | 5/1987 | Heemskerk | 250/201 |
| 4,750,162 | 6/1988 | Tajima | 369/46 |
| 4,817,072 | 3/1989 | Toide et al. | 250/201 |

FOREIGN PATENT DOCUMENTS 63-13134 1/1988 Japan .

Primary Examiner—David C. Nelms
Attorney, Agent, or Firm—Birch, Stewart, Kolasch & Birch

[57] ABSTRACT

An optical pickup device includes a light source, an optical lens system that converges light beams from the light source onto a recording medium, a photodetector with three divided regions that detects light beams reflected from the recording medium, and a hologram optical element that introduces the reflected light beams from the recording medium into the photodetector. The hologram optical element is divided into two regions, a part of the reflected light beams from the recording medium is diffracted by the first region of the hologram optical element and focused on a division line in the direction of the diffraction of the hologram optical element. The division line divides the photodetector into two regions, the first region and the second region. The other part of the reflected light beams is diffracted by the second region of the hologram optical element and focused on the third region of the photodetector. A difference in the output intensity between the first and second regions of the photodetector results in a focus error signal and the total of the output intensity of the first, second and third regions of the photodetector results in an information signal.

5 Claims, 4 Drawing Sheets

FIG. 3
PRIOR ART
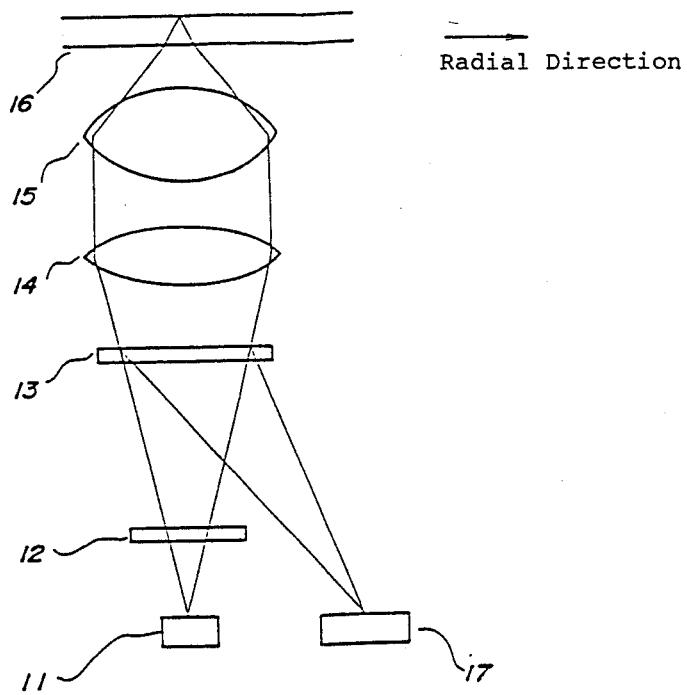
Radial Direction
---PRIOR ART---
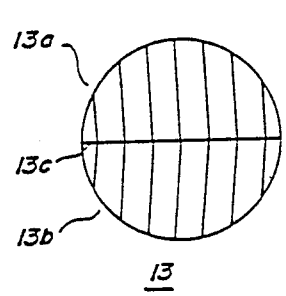
FIG.4a
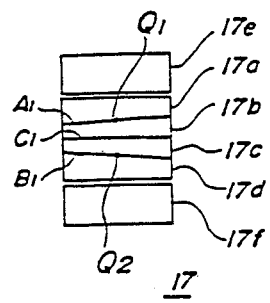
FIG.4b
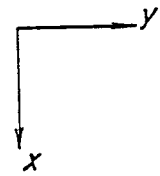
FIG.4c

FIG. 5
PRIOR ART
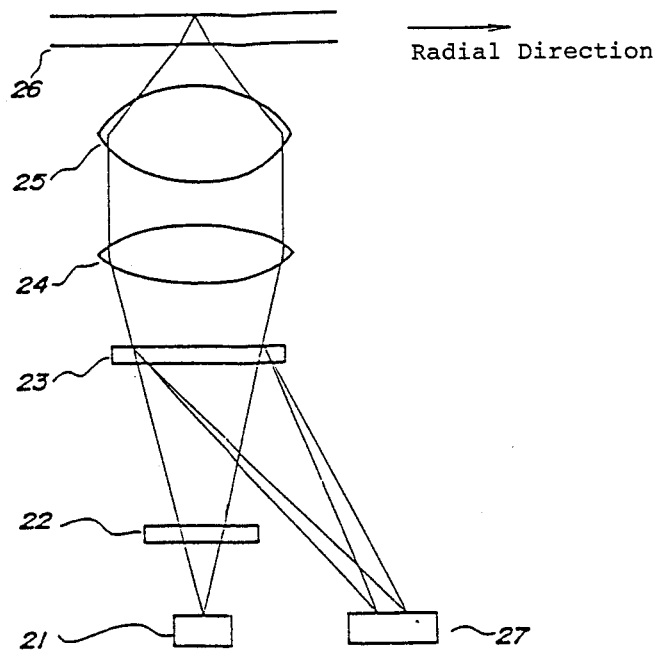
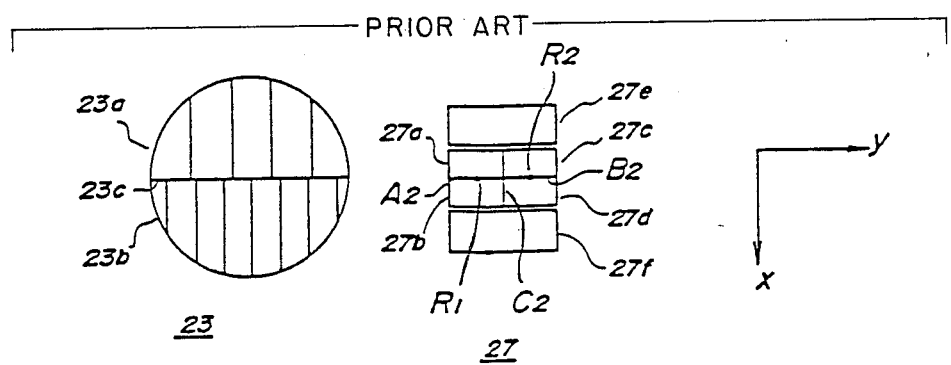
FIG.6a  FIG.6b  FIG.6c

FIG. 7
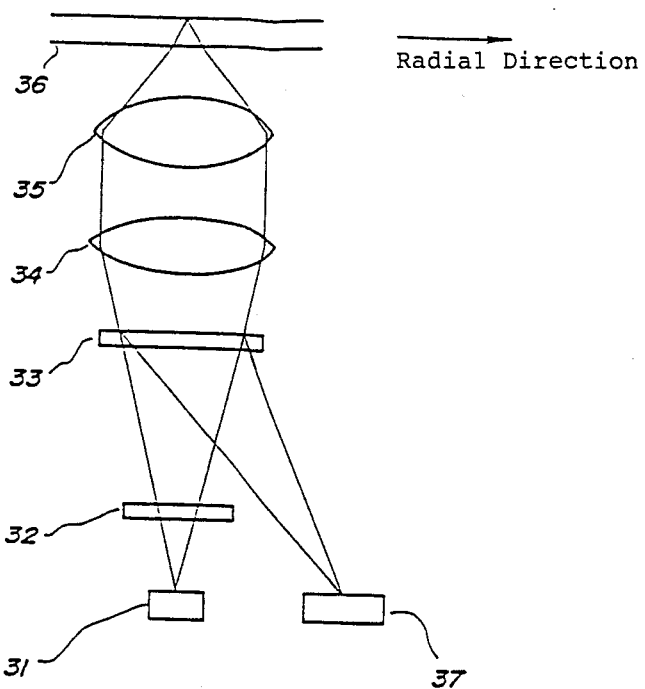
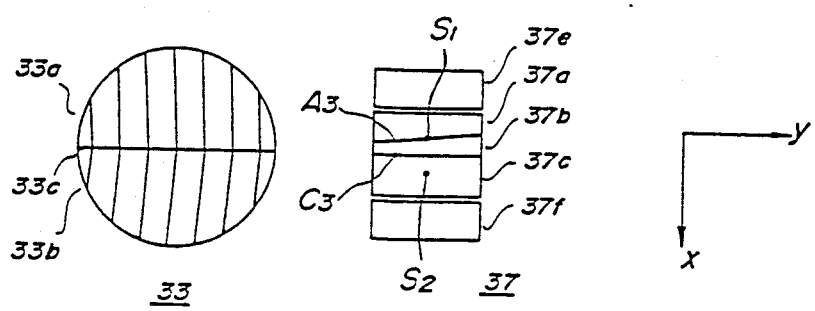
FIG. 8a  FIG. 8b  FIG. 8c

1

OPTICAL PICKUP DEVICE WITH DIFFRACTION SENSING

BACKGROUND OF THE INVENTION

1. Field of the Invention

The present invention relates to an optical pickup device that can be used in information-reproducing apparatus such as compact disc reproducing apparatii, video disc reproducing apparatii and the like.

2. Description of the Prior Art

FIG. 3 shows a conventional optical pickup device that has a semiconductor laser 11, a grating 12, a hologram optical element 13, a collimating lens 14, and an object lens 15. A light beam from the semiconductor laser 11 is diffracted by the grating 12, resulting in three separate beams, one of which is the zero-order diffracted beam (below referred to as the main beam), and the other of which are the firstorder diffracted beams (below referred to as the sub-beams) in the positive and negative directions that are substantially orthogonal to the plane in FIG. 3. These three separate beams are further diffracted by the hologram optical element 13. The resulting zero-order diffracted beam of each of the above-mentioned separate beams enters the object lens 15 via the collimating lens 14 and is focused on a recording medium 16. When the main beam is focused on a pit of the recording medium 16, the intensity of the beam reflected from the recording medium 16 gives a pit signal. The two sub-beams, which are positioned symmetrically with respect to the above-mentioned main beam, are focused on the recording medium 16 in such a way that they shift to a larger extent in the tracking direction of the recording medium 16 and to a small extent in the radial direction of the recording medium 16, thereby generating a tracking error signal from a difference in the intensity between the two sub-beams reflected from the recording medium 16. The beams reflected from the recording medium 16 pass through the object lens 15 and the collimating lens 14 and are diffracted by the hologram optical element 13, and the resulting first-order diffracted beams are introduced into a photodetector 17.

FIG. 4(a) shows the relationship between the configuration of the hologram optical element 13 that is seen from the recording medium 16, and FIG. 4(b) shows the configuration of the photodetector 17. The hologram optical element 13 is divided into two regions 13a and 13b by a division line 13c in the radial direction. The regions 13a and 13b have a number of grating lines that are inclined with respect to the division line 13c and that are symmetrical about the division line 13c. The photodetector 17 is divided into six regions 17a, 17b, 17c, 17d, 17e, and 17f. FIG. 4(c) shows the orientation of the devices of FIGS. 4(a) and 4(b).

When a beam from the semiconductor laser 11 is precisely focused on the recording medium 16 or set at the correct focus, the resulting main beam that has been diffracted by the region 13a of the hologram optical element 13 is focused on the division line $A_1$ of photodetector 17 to form a spot $Q_1$ on the division line $A_1$. The resulting main beam that has been diffracted by the region 13b of the hologram optical element 13 is focused on the division line $B_1$, to form a spot $Q_2$ on the division line $B_1$. The resulting sub-beams are focused on the regions 17e and 17f of the photodetector 17. when output signals of the photodetecting regions 17a, 17b, 17c, 17d, 17e, and 17f are represented respectively as $S_{1a}$, $S_{1b}$, $S_{1c}$, $S_{1d}$, $S_{1e}$, and $S_{1f}$, a focus error signal is obtained by calculating $(S_{1a}+S_{1d})-(S_{1b}+S_{1c})$, a tracking error signal is obtained by calculating $(S_{1e}-S_{1f})$, and a pit signal (i.e., an information signal) is obtained by calculating $(S_{1a}+S_{1b}+S_{1c}+S_{1d})$.

FIG. 5 shows another conventional optical pickup device, which is different from the above-mentioned conventional device in the configurations of both the hologram optical element 23 and the photodetector 27. FIG. 6(a) shows the relationship between the configuration of the grating lines of the hologram optical element 23 that is seen from the recording medium 26 and FIG. 6(b) shows the configuration of the photodetector 27. FIG. 6(c) shows the orientation of the devices in FIGS. 6(a) and 6(b). The hologram optical element 23 is divided into two regions 23a and 23b by a division line 23c in the radial direction. The regions 23a and 23b have a number of grating lines that are at right angles to the division line 23c. The grid pitch of one region 23a is different from that of the other 23b. The photodetector 27 are divided into six regions 27a, 27b, 27c, 27d, 27e, and 27f. When a beam from the semiconductor laser 11 is precisely focused on the recording medium 26 or set at the correct focus, the resulting main beam that has been diffracted by the region 23a is focused on the division line $A_2$ to form a spot $R_1$. The resulting main beam that has been diffracted by the region 23b is focused on the division line $B_2$ to form a spot $R_2$. The resulting sub-beams are focused on the photodetecting region 27e and 27f. When output signals of the photodetecting regions 27a, 27b, 27c, 27d, 27e, and 27f are represented respectively as $S_{2a}$, $S_{2b}$, $S_{2c}$, $S_{2d}$, $S_{2e}$, and $S_{2f}$, a focus error signal is obtained by calculating $(S_{2a}+S_{2d})-(S_{2b}+S_{2c})$, a tracking error signal is obtained by calculating $(S_{2e}-S_{2f})$, and a pit signal is obtained by calculating $(S_{2a}+S_{2b}+S_{2c}+S_{2d})$.

In the conventional optical pickup devices with the above-mentioned structures, the spots $Q_1$ and $Q_2$ ($R_1$ and $R_2$) based on the beams reflected from the recording medium 16(26) must be precisely formed on the division lines of the photodetector 17(27). To achieve this, a delicate adjustment must be carried out so that the hologram optical element 13(23) and the photodetector 17(27), respectively, can be disposed at a given position. However, in order that the hologram optical element 13(23) and the photodetector 17(27) are constructed to be moved separately, there must be a supporting structure by which the photodetector 17(27) is freely moved. This makes the entire structure of the device complicated, causing difficulties in obtaining a light-weight, miniaturized device. Moreover, a number of positioning parts are needed, which makes the production process of the device complicated and makes the production cost expensive.

Japanese Laid-Open Patent Application 63-13134 discloses an optical pickup device that has the same structure as that of FIGS. 6(a) and 6(b) mentioned above, except that the hologram optical element functions as an anastigmatic lens. The focus error signal of this pickup device is represented by the same calculation equation as that of the focus error signal of the pickup device of FIGS. 6(a) and 6(b). Thus, the pickup device of the above-mentioned Japanese Laid-Open Patent Application has the same problems as those of the pickup device of FIGS. 6(a) and 6(b).

To solve these problems, the present invention incorporates both the semiconductor laser 11(21) and the photodetector 17(27) into the same package so that the positioning of the spots $Q_1$ and $Q_2$ ($R_1$ and $R_2$) on the division lines of the photodetector 17(27) can be carried out by the positional adjustment of the hologram optical element 13(23) alone. However, in the optical pickup device with such a structure, the slight shifting of the positions of the semiconductor laser 11(21) and the photodetector 17(27) from those of the initial plan makes it impossible to form the beam spots at the correct positions of the photodetector 17(27), resulting in a focus offset. To remove this focus offset, the position of the hologram optical element 13(23) must be adjusted by a forward or backward movement and/or the rotation of the hologram optical element 13(23) so as to shift the spots on the photodetector 17(27) thereby making the focus error signal become zero when the beam from the semiconductor layer 11(21) is at the correct focus on the recording medium 16(26). However, the two spots on the photodetector 17(27) that are formed based on the main beams shift at the same time. In this way, the position of the hologram optical element 13(23) cannot be adjusted without the simultaneous shifting of these beam spots on the photodetector 17(27). Moreover, there is a possibility that the shifting of the two spots are countervailed on the focus error signals corresponding thereto. To avoid this, the hologram optical element must be moved to a great extent in the direction of the y-axis. Especially, with the optical pickup device shown in FIGS. 5 and 6, because the length of each of the divided regions of the photodetector 27 in the direction of the y-axis is short, when a great focus offset occurs and the hologram optical element 23 is moved to a great extent in the direction of the y-axis to compensate the focus offset, the beam spots $R_1$ and $R_2$ on the photodetector 27 shift to a great extent in the direction of the y-axis and slip out of the photodetecting regions on which these spots must be formed.

Moreover, because the hologram optical element 13(23) must be moved to compensate the focus offset phenomenon, a photodetector 17(27) that is large enough to receive the beam spots is required, makes the cost of production expensive.

SUMMARY OF THE INVENTION

The optical pickup device of the present invention, which overcomes the above-discussed and numerous other disadvantages and deficiencies of the prior art, comprises a light source, an optical lens system that converges light beams from said light source onto a recording medium, a photodetector with three divided regions that detects light beams reflected from the recording medium, and a hologram optical element that introduces the reflected light beams from the recording medium into said photodetector, wherein said hologram optical element is divided into two regions. A part of the reflected light beams from the recording medium is diffracted by the first region of the hologram optical element and focused on a division line in the direction of the diffraction of the hologram optical element. The division line divides the photodetector into two regions, a first region and a second region. The other part of the reflected light beams is diffracted by the second region of the hologram optical element and focused on the third region of the photodetector. A difference in the output intensity between the first and second regions of the photodetector results in a focus error signal and the total of the output intensity of said first, second and third regions of said photodetector results in an information signal.

In a preferred embodiment of the present invention, the effective photodetecting area of the first region of the photodetector is approximately equal to that of the second region of the photodetector, and the total of the two effective photodetecting areas of the first and second region of the photodetector is approximately equal to the effective photodetecting area of the third region of the photodetector.

In another embodiment of the present invention, each the hologram optical element that is divided by a division line, has a certain number of grating lines.

In a preferred embodiment, the light source and the photodetector are incorporated into the same package.

In a preferred embodiment, the optical pickup device is of a three-beam mode.

Thus, the invention described above and below makes possible the objective of providing an optical pickup device in which the adjustment of the part of the device in compensation for a focus offset can be simplified.

BRIEF DESCRIPTION OF THE DRAWINGS

The present invention may be better understood and its numerous objects and advantages will become apparent to those skilled in the art by reference to the accompanying drawings as follows:

FIG. 3 is a side view showing a conventional optical pickup device;

FIGS. 4(a), 4(b), and 4(c) are schematic diagrams showing the relationship between the hologram optical element 13 and the photodetector 17 with six divided regions shown in FIG. 3;

FIG. 5 is a side view showing another conventional optical pickup device;

FIGS. 6(a), 6(b), and 6(c) are schematic diagrams showing the relationship between the hologram optical element 23 and the photodetector 27 with six divided regions shown in FIG. 5.

FIG. 7 is a side view showing the fundamental structure of another optical pickup device of the present invention; and FIGS. 8(a), 8(b), and 8(c) are schematic diagrams showing the relationship between the hologram optical element 33 and the photodetector 37 with five divided regions shown in FIG. 7.

DESCRIPTION OF THE PREFERRED EMBODIMENTS

Example 1

Figure 1:
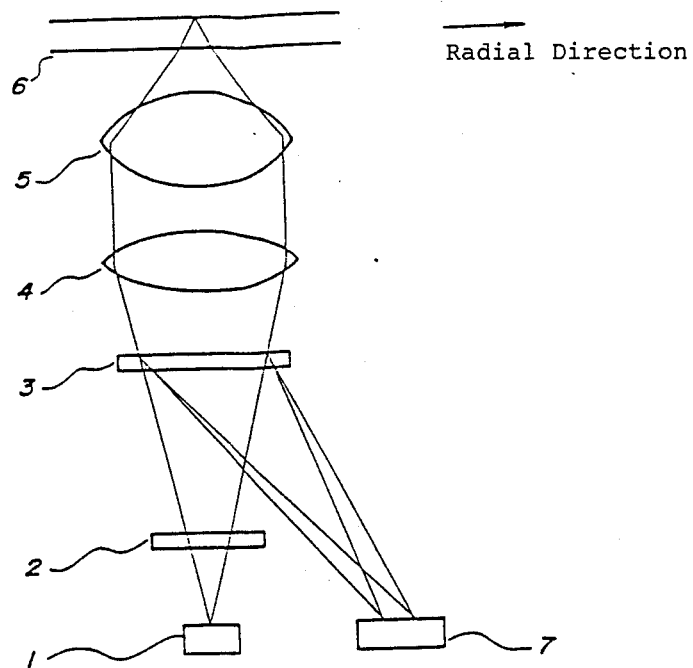
FIG. 1 is a side view showing the fundamental structure of an optical pickup device of the present invention.

FIG. 1 shows an optical pickup device of this invention, which comprises a light source such as a semiconductor laser 1, an optical lens system, including a grating 2, a collimating lens 4 and an object lens 5, to converge light beams from the light source on a recording medium 6, a photodetector 7 for detecting light beams reflected from the recording medium 6, and a hologram optical element 3 for introducing the reflected light into the photodetector 7.

A light beam from the semiconductor laser 1 is diffracted by the grating 2, resulting in three separate beams, one of which is the zero-order diffracted beam (below referred to as the main beam), and the others of which are first-order diffracted beams (below referred to as the subbeams) in the positive and negative directions that are substantially orthogonal to the plane in FIG. 1. These three separate beams are further diffracted by the hologram optical element 3. The resulting zero-order diffracted beam of each of the above-mentioned separate beams enters the object lens 5 via the collimating lens 4 and is focused on a pit of the recording medium 6. A pit signal (i.e., an information signal) results from the intensity of the beam reflected from the recording medium 6. The two sub-beams, which are positioned symmetrically with respect to the above-mentioned main beam, are focused on the recording medium 6 in such a way that they shift to a large extent in the tracking direction and to a small extent in the radial direction. A difference in the intensity between the two sub-beams reflected from the recording medium 6 gives a tracking error signal. The beams reflected from the recording medium 6 pass through the object lens 5 and the collimating lens 4 and are diffracted by the hologram optical element 3. The resulting first-order diffracted beams are introduced into the photodetector 7. The semiconductor laser 1 and the photodetector 7 are fixed to each other within the same package.

Figure 2A:
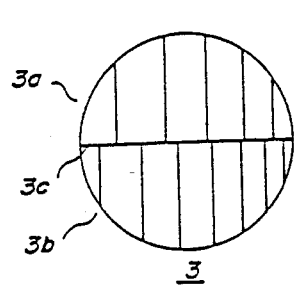
FIGS. 2(a), 2(b), and 2(c) are schematic diagrams showing the relationship between the hologram optical element 3 and the photodetector 7 with five divided regions shown in FIG. 1.
Figures 2B, 2C:
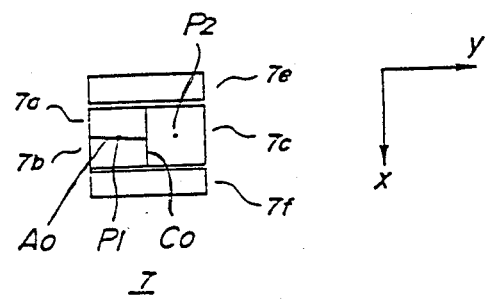

FIG. 2(a) shows the relationship between the configuration of a number of grating lines of the hologram optical element 3 that is seen from the recording medium 6 and FIG. 2(b) shows the configuration of the photodetector 7. FIG. 2(c) shows the orientation of the devices in FIGS. 2(a) and 2(b). The hologram optical element 3 is divided into two regions 3a and 3b by a division line 3c in the radial direction. The regions 3a and 3b have a number of grating lines, the pitches of which are different from each other. Each of the grating lines is gently inclined to eliminate aberrations. The photodetector 7 is divided into five regions 7a, 7b, 7c, 7e, and 7f. The division line $A_o$ is slightly inclined with respect to the direction of the diffraction of the hologram optical element 3 so as to prevent occurrence of a focus offset. When the beam from the semiconductor laser 1 is precisely focused on the recording medium 6 or at the correct focus, the resulting main beam that has been diffracted by the region 3a of the hologram optical element 3 is focused on the division line $A_o$ of the photodetector 7 to form a spot $P_1$. The and the resulting main beam that has been diffracted by the region 3b of the hologram optical element 3 is focused on the photodetecting region 7c to form a spot $P_2$. When output signals of the photodetecting regions 7a, 7b, 7c, 7e, and 7f are represented respectively as Sa, Sb, Sc, Se, and Sf, a focus error signal is obtained by calculating (Sa−Sb), a tracking error signal is obtained by calculating (Se−Sf), and a pit signal is obtained by calculating (Sa+Sb+Sc).

In the optical pickup device of the present invention with the above-mentioned structure, the adjustment of this device for the elimination of a focus offset can be attained by shifting a spot $P_1$ along because the spot $P_2$ has no relation to a focus error signal. Accordingly, by the rotation of the hologram optical element 3, the spot $P_1$ that is formed on the photodetector 7 is shifted in the direction of the x-axis, so that the adjustment of this device for the elimination of a focus offset can be attained. In this way, because the forward or backward movement of the hologram optical element 3 is unnecessary to eliminate such a focus offset, the size of the hologram optical element 3 can be set at that of the beams that enter the said hologram optical element 3. Moreover, the effective photodetecting area of the photodetecting region 7a is approximately equal to that of the photodetecting region 7b, and the total of the two effective photodetecting areas is approximately equal to the effective photodetecting area of the photodetecting region 7c. This is because the influence of light reflected from the cap of the semiconductor laser 1 and/or of dark current to the photodetector 7 on the signals with respect to the region 7a becomes equal to that of the region 7b, thereby suppressing occurrence of an offset in error-detecting signals.

Example 2

FIG. 7 shows another optical pickup device of this invention in which the hologram optical element 33 is divided into two regions 33a and 33b by a division line 33c in the radial direction. The regions 33a and 33b has a number of grating lines that are symmetrical with respect to the division line 33c. The photodetector 37 is divided into five regions 37a, 37b, 37c, 37e, and 37f. The beams that have been diffracted by the hologram optical element 33 are focused on the division line $A_3$ of the photodetector 37 and on the photodetecting region 37c, respectively, to form spots $S_1$ and $S_2$. When output signals of the photodetecting regions 37a, 37b, 37c, 37e, and 37f are represent respectively as $S_{3a}$, $S_{3b}$, $S_{3c}$, $S_{3e}$, and $S_{3f}$, a focus error signal is obtained by calculating $(S_{3a}-S_{3b})$, a tracking error signal is obtained by calculating $(S_{3e}-S_{3f})$, and a pit signal is obtained by calculating $(S_{3a}+S_{3b}+S_{3c})$. The focus offset phenomenon can be prevented by the shifting of the spot $S_1$ alone, which is performed by the rotation of the hologram optical element 33. Thus, the size of the hologram optical element 33 can be set, as well, at that of the beams that are incident upon it. Moreover, for the same reason as described in Example 1, the effective photodetecting area of the photodetecting region 37a is approximately equal to that of the photodetecting region 37b, and the total of the two effective photodetecting areas is approximately equal to the effective photodetecting area of the photodetecting region 37c.

Although the above-mentioned examples only disclose an optical pickup device with a three-beam mode, this invention is, of course, applicable to an optical pickup device with an one-beam mode at the time when the parts of the pickup device are positioned so that the division line 3c(33c) of the hologram optical element 3(33) is positioned in the tracking direction, thereby representing a tracking error signal by [Sc−(Sa+Sb)]- {or $[S_{3c}-(S_{3a}+S_{3b})]$.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical pickup device comprising:
a light source;

an optical lens system that converges light beams from said light source onto a recording medium;

a photodetector with three divided regions that detects light beams reflected from said recording medium; and a hologram optical element that introduces the reflected light beams from said recording medium into said photodetector;

said hologram optical element being divided into a first hologram region and a second hologram region, a part of the reflected light beams from said recording medium is diffracted by said first hologram region of said hologram optical element and focused on a division line in said photodetector in the direction of the diffraction of said hologram optical element;

said division line dividing said photodetector into a first photodetector region and a second photodetector region, and an other part of the reflected light beams is diffracted by said second hologram region of said hologram optical element and focused on a third photodetector region of said photodetector;

said photodetector generating an output intensity from first and second photodetector regions of said photodetector wherein a difference between the output intensity of said first and second photodetector regions results in a focus error signal and a total of the output intensity from said first, second and third photodetector regions of said photodetector results in an information signal.

2. The optical pickup device according to claim 1, wherein an effective photodetecting area of said first photodetector region of said photodetector is approximately equal to that of said second photodetector region of said photodetector, and a total of the two effective photodetecting areas of said first and second photodetector region of said photodetector is approximately equal to an effective photodetecting area of said third photodetector region of said photodetector.

3. The optical pickup device according to claim 1, wherein each of said first and second hologram regions of said hologram optical element is divided by a dividing line and has a number of grating lines.

4. The optical pickup device according to claim 1, wherein said light source and said photodetector are incorporated into the same package.

5. The optical pickup device according to claim 1, which is of a three-beam mode.

* * * * *